United States Patent
Lim (10) Patent No.: US 10,514,442 B2
(45) Date of Patent: Dec. 24, 2019

(54) DYNAMIC CODE ALLOCATING APPARATUS AND METHOD

(71) Applicant: Electronics and Telecommunications Research Institute, Daejeon (KR)

(72) Inventor: Jae Han Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 417 days.

(21) Appl. No.: 15/414,203

(22) Filed: Jan. 24, 2017

(65) Prior Publication Data
US 2017/0261596 A1    Sep. 14, 2017

(30) Foreign Application Priority Data

Mar. 14, 2016   (KR) .................. 10-2016-0030116

(51) Int. Cl.
*G01S 7/02*   (2006.01)
*G01S 13/95*   (2006.01)
(Continued)

(52) U.S. Cl.
CPC .............. *G01S 7/023* (2013.01); *G01S 13/95* (2013.01); *H04J 13/0003* (2013.01);
(Continued)

(58) Field of Classification Search
CPC ........ G01S 7/023; G01S 7/021; G01S 13/931; G01S 13/284; G01S 1/045; G01S 2013/9375; G01S 13/87; G01S 2013/9378; G01S 7/292; G01S 7/4021; G01S 7/282; G01S 7/354; G01S 7/352; G01S 13/95; H04W 16/14; H04W 84/12; H04W 72/0453; H04W 72/04; H04W 40/16;
(Continued)

(56) References Cited

U.S. PATENT DOCUMENTS 6,822,605 B2 * 11/2004 Brosche .................. G01S 7/282
342/130
9,008,158 B2    4/2015 Kim et al.
(Continued)

FOREIGN PATENT DOCUMENTS

| KR | 20010002408 A | 1/2001 |
| KR | 20070110845 A | 11/2007 |
| KR | 20150083306 A | 7/2015 |

OTHER PUBLICATIONS

Hai Deng, Polyphase Code Design for Orthogonal Netted Radar Systems, IEEE Transactions on Signal Processing, Nov. 14, 2004, pp. 3126-3135, vol. 52, No. 11, IEEE, Korea.
(Continued)

*Primary Examiner* — Olumide Ajibade Akonai
(74) *Attorney, Agent, or Firm* — William Park & Associates Ltd.

(57) ABSTRACT

Provided is a code allocating apparatus including an interference signal measurer configured to measure interference signals, an interference signal sharer configured to control radars to share the measured interference signals between the radars, a code allocator configured to dynamically allocate a code generated based on the measured interference signals to each of the radars, and a code applier configured to apply the code to each of the radars.

14 Claims, 3 Drawing Sheets

(51) Int. Cl.
*H04J 13/00* (2011.01)
*H04J 13/16* (2011.01)
*H04L 5/00* (2006.01)
*H04W 40/16* (2009.01)
*H04W 16/14* (2009.01)

(52) U.S. Cl.
CPC ............ *H04J 13/16* (2013.01); *H04L 5/0062* (2013.01); *H04W 16/14* (2013.01); *H04W 40/16* (2013.01)

(58) Field of Classification Search
CPC ...... H04B 17/345; H04B 1/06; H04B 1/1027; H04B 2001/1045; H04J 11/0023; H04J 13/0003; H04J 13/16; H04J 5/0062
See application file for complete search history.

(56) References Cited

U.S. PATENT DOCUMENTS

| | | |
|---|---|---|
| RE45,807 E | 11/2015 | Agee et al. |
| 9,612,324 B2* | 4/2017 | Morita ................ G01S 7/023 |
| 2007/0188373 A1* | 8/2007 | Shirakawa ............ G01S 7/023 |
| | | 342/70 |
| 2007/0200747 A1* | 8/2007 | Okai ..................... G01S 7/023 |
| | | 342/70 |
| 2009/0028097 A1* | 1/2009 | Patel ................... H04W 16/14 |
| | | 370/329 |
| 2011/0140949 A1 | 6/2011 | Lee |
| 2011/0248881 A1 | 10/2011 | Cornic et al. |
| 2013/0022010 A1* | 1/2013 | Qianxi ................. H04L 5/0033 |
| | | 370/329 |
| 2014/0078922 A1* | 3/2014 | Xing .................... H04J 11/005 |
| | | 370/252 |
| 2014/0145872 A1* | 5/2014 | Shirakawa ............ G01S 7/2928 |
| | | 342/132 |
| 2015/0061915 A1* | 3/2015 | Kishigami ............. G01S 7/023 |
| | | 342/27 |
| 2015/0123840 A1* | 5/2015 | Morita .................. G01S 7/02 |
| | | 342/175 |
| 2016/0154091 A1* | 6/2016 | Yosoku ................. G01S 7/023 |
| | | 342/201 |
| 2016/0198486 A1* | 7/2016 | Moshavi ............... H04W 72/12 |
| | | 455/450 |
| 2016/0223644 A1* | 8/2016 | Soga .................... G01S 7/023 |

OTHER PUBLICATIONS

Namyoon Lee et al., Orthogonal Pulse Compression Code Design for Waveform Diversity in Multistatic Radar Systems, Radar Conference, May 26-28, 2008, IEEE, Korea.

Seung-Jae Lee et al., A Study on Frequency Reuse Method of Ocean Surface Radar Using Matched Filtering and Orthogonal Waveforms, Proceedings of Symposium of the Korean Institute of Communications and Information Sciences, Jan. 2013, pp. 211-212, Korea Institute of Communication Sciecnes, Korea.

Sun-Min Lim et al., A Study on Frequency Reuse Method for Multi-site Weather Radar, The Journal of Korean Institute of Communications and Information Sciences, vol. 39A, Issue 2, 2014, pp. 109-116, The Korean Institute of Communications and Information Sciences, Korea.

* cited by examiner

DYNAMIC CODE ALLOCATING APPARATUS AND METHOD

CROSS-REFERENCE TO RELATED APPLICATION(S)

This application claims the priority benefit of Korean Patent Application No. 10-2016-0030116 filed on Mar. 14, 2016, in the Korean Intellectual Property Office, the disclosure of which is incorporated herein by reference for all purposes.

BACKGROUND

1. Field

One or more example embodiments relate to a dynamic code allocating apparatus and method, and more particularly, to a signal processing scheme for increasing an accuracy of detecting a weather parameter of a weather radar.

2. Description of Related Art

A weather radar network system (WRNS) is a radar cluster including a plurality of radars for observing meteorological changes in a relatively large area and for enhancing accuracy of meteorological observation. A radar network may comprise a number of radars each installed in a different location to measure meteorological changes in a predetermined area. In a radar network system, until recently a channel has been used that does not cause interference between radars, to remove a source of interference that may affect the radars. This solution occupies a large number of frequencies. A radar network system that uses a frequency more efficiently is required because the number of available frequencies is becoming insufficient due to the great and steady increase in the number of mobile devices.

Research on a weather radar frequency sharing technology that allows radars to use a same frequency band to use a frequency more efficiently is being conducted by a number of institutions. A representative technology may allow different orthogonal codes to be allocated to each of radars such that the radars transmit the orthogonal codes in a WRNS using a code division radar sharing technology and then remove other radar signals by passing the other radar signals through a matched filter from a receiving end using a corresponding code. Each of radars may adopt a pulse compression method that transmits a pulse by dividing the pulse into a number of short sub pulses in order to apply a current code division method.

Performance of a code division radar sharing technology may be determined based on a code allocated to each of the radars. In more detail, to be able to more accurately measure a weather target, it is necessary to carry out research on an algorithm for allocating and generating a code for effectively removing both of an interference signal, for example, a cross correlation interference signal, coming from another radar and a floating interference signal, for example, an auto correlation floating interference signal, coming from an auto correlation caused by use of a pulse compression code.

SUMMARY

According to an aspect, there is provided a code allocating apparatus including an interference signal measurer configured to measure interference signals, an interference signal sharer configured to control radars to share the measured interference signals between the radars, a code allocator configured to dynamically allocate a code generated based on the measured interference signals to each of the radars, and a code applier configured to apply the code to each of the radars.

The apparatus may further include a memory configured to store a code set for allocating the code. The interference signal sharer may be configured to store the measured interference signals and allow the interference signals to be exchanged between the radars. The code allocator may be configured to generate an objective function based on the interference signals, and the objective function is generated by allocating a weight to each of the shared interference signals. The code allocator may be configured to select an optimal code set among pre-generated code sets using the objective function. The code allocator may be configured to apply the optimal code set to each of the radars. The apparatus may further include a code interval adjuster configured to adjust an interval during which the code is generated, and control the interference signal measurer to measure the interference signals based on the interval during which the code is generated.

According to another aspect, there is provided a code allocating method including measuring interference signals, controlling radars to share the measured interference signals between the radars, dynamically allocating a code generated based on the interference signals to each of the radars, and applying the code to each of the radars.

The method may further include storing a code set for allocating the code in a memory. The method may further include storing the measured interference signals and exchanging the interference signals between the radars by an interference signal sharer. The method may further include generating an objective function based on the measured signals, wherein the objective function is generated by allocating a weight to each of the shared interference signals. The method may further include selecting an optimal code set among pre-generated code sets using the objective function. The method may further include applying the optimal code set to each of the radars. The method may further include adjusting an interval during which the code is generated, and controlling an interference signal measurer to measure the interference signals based on the interval during which the code is generated.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 1:
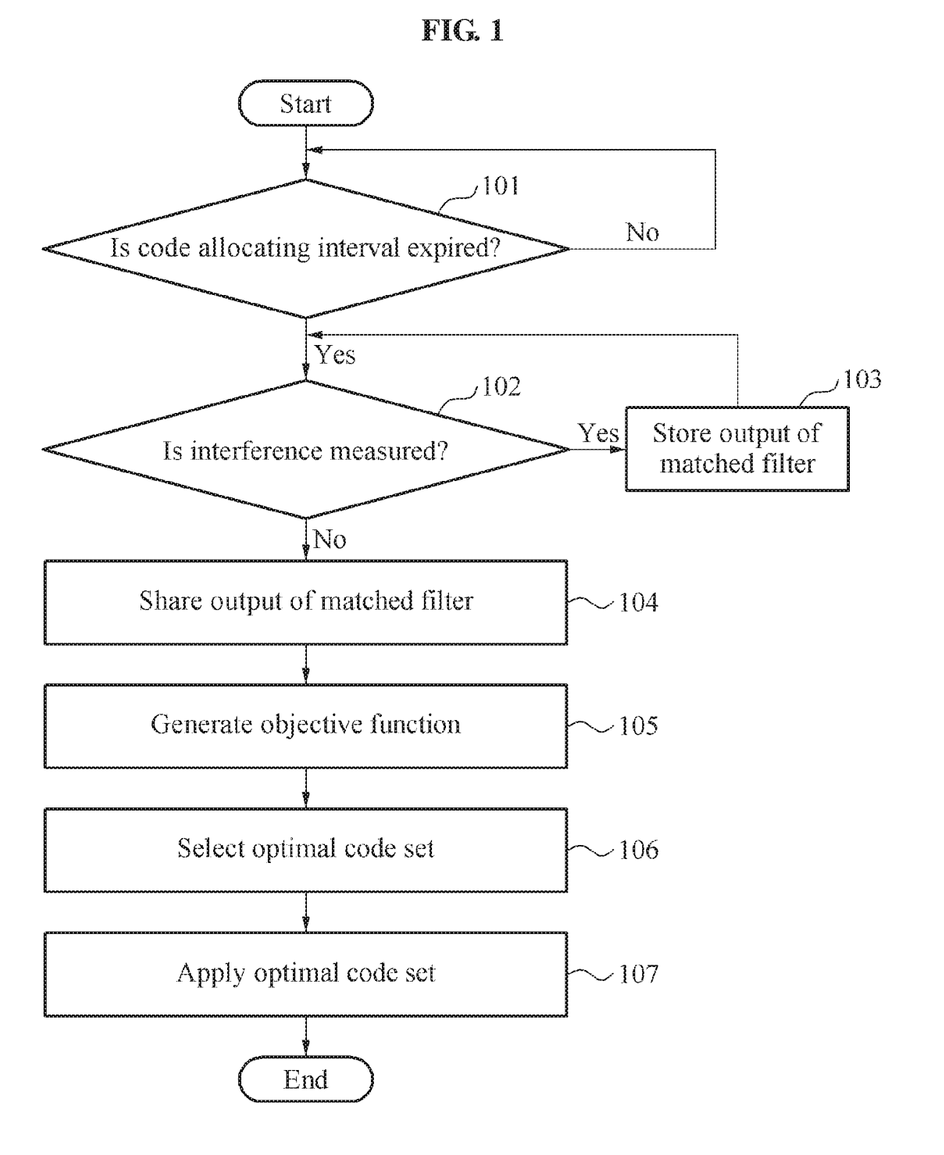
FIG. 1 is a flowchart illustrating a code allocating algorithm according to an example embodiment.

FIG. 1 is a flowchart illustrating a code allocating algorithm according to an example embodiment.

The present disclosure discloses a dynamic code allocating apparatus and method in a weather radar network system (WRNS) in which a frequency is shared. More particularly, the present disclosure discloses a scheme for generating and allocating an optimal code set that adapts to a change in an amount of mutual interference caused by rotation of a weather radar and a movement of a weather target, a fine-grained scheme for measuring an interference amount for each radar pair and applying the interference amount to an optimizing algorithm, and an apparatus configuration for implementing the foregoing schemes. To generate and allocate an optimal code set, firstly, each weather radar may measure a change in an interference amount from another radar in real-time, and secondly, each weather radar may generate an objective function for generating the optimal code set based on the measured interference amount and generate the optimal code set that minimizes a value of the objective function. Thirdly, each radar may use and adopt the generated optimal code set. The change in the interference amount may be firstly measured for the fine-grained scheme applied to an optimizing algorithm, but a weight of a cross correlation value may be differently set when the objective function is generated in order to apply weights to each radar pair.

Figure 2:
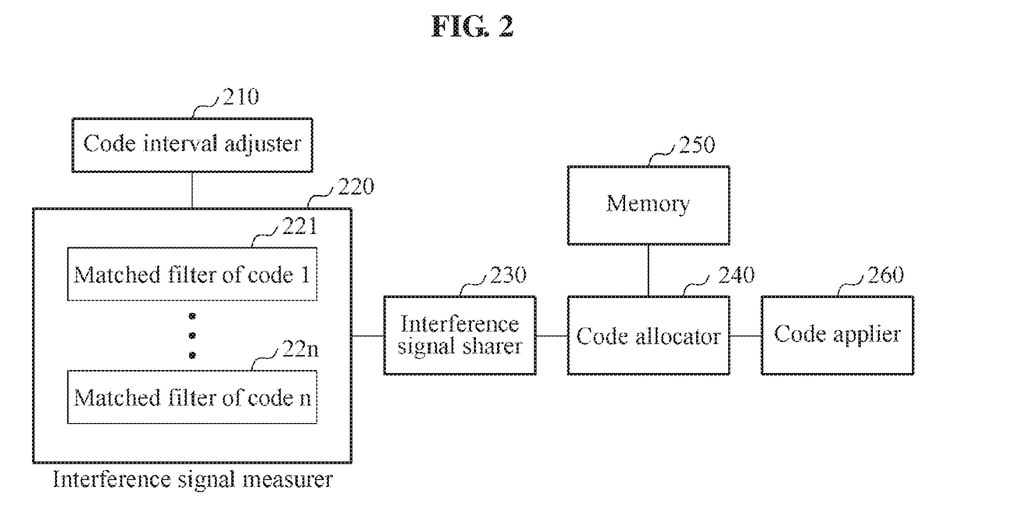
FIG. 2 is a block diagram illustrating a code allocating apparatus according to an example embodiment.

FIG. 2 is a block diagram illustrating a code allocating apparatus according to an example embodiment.

The code allocating apparatus includes a code interval adjuster 210, an interference signal measurer 220, an interference signal sharer 230, a code allocator 240, a memory 250, and a code applier 260. The interference signal measurer 220 may include a matched filter 221 of a first code through a matched filter 22n of an n-th code.

Figure 3:
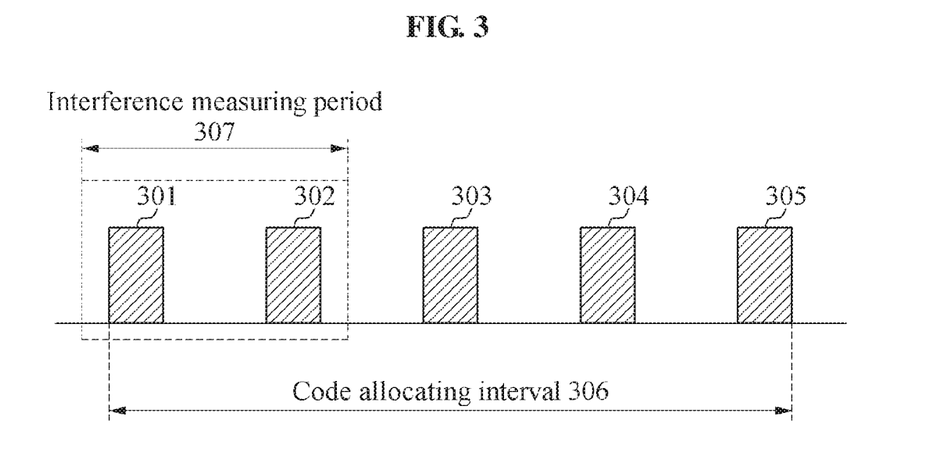
FIG. 3 is a diagram illustrating a relationship between a code allocating interval and interference signals according to an example embodiment.

Referring to FIG. 3, a configuration for measuring interference signals is illustrated. FIG. 3 is a diagram illustrating a relationship between a code allocating interval and interference signals according to an example embodiment.

A code allocating apparatus includes the interference signal measurer 220 configured to measure interference signals. Before the interference signals are measured, the code allocating apparatus verifies whether a code allocating interval has elapsed in operation 101. When the code allocating interval has not elapsed, the verification in operation 101 is repeated until the code allocating interval elapses. An interference interval may be measured when the code allocating interval has elapsed. The interference signal measurer 220 may measure an amount of mutual interference between radars. A matched filter may include n codes previously used by the radars in an operation (corresponding to m initial pulses of a code allocating interval T 306) for measuring the interference signals, and the interference signal measurer 220 may store result values. The amount of mutual interference between the radars may be measured at an initial period of the code allocating interval T 360. In more detail, the code allocating interval T 306 may have values of N pulse repetition times (PRTs), and m initial pulses of the N PRTs may be used for measuring the amount of mutual interference. Referring to FIG. 3, five interference signals 301, 302, 303, 304, and 305 are included in the code allocating interval T 306. Here, the code allocating interval T 306 may have four PRTs. However, as described above, all interference signals in the code allocating interval T 306 may not be measured when the interference signal measurer 220 measures the interference signals during an interference measuring period 307. When the code allocating apparatus measures the interference signals in operation 102, the code allocating apparatus stores an output value of the matched filter in operation 103. When the interference signals are not measured, the code allocating apparatus shares the output value of the matched filter of another radar in operation 104. During the interference measuring period 307, only two initial interference signals 301 and 302 may be measured and obtained, and an output value may be stored by inputting the output value to each of pre-obtained n matched filters 221 through 22n illustrated in FIG. 2.

Each of the radars may use an output value of a matched filter to measure the amount of mutual interference between the radars. Codes, one allocated to each of the radars may be orthogonal to each other (may not be perfectly orthogonal) during an interval during which the code allocating apparatus operates and thus, the output value of the matched filter including the code allocated to each of the radars may be considered to be an indication of a level of interference of another radar. For example, an output value of a matched filter including a code of the matched filter may be considered to be a signal intensity of the matched filter sensed by each of the radars. In more detail, an interference amount of a radar j sensed by a radar i($1 <= i <= k$) may be obtained based on an output value of a matched filter including a code allocated to the radar j using a signal received from an interference measurement phase. Similarly, the radar i may include a matched filter including a code of another radar other than the radar j, and an output value of each matched filter may be obtained.

Also, k output values obtained by each of the radars may be used for generating the objective function and generating an optimal code that minimizes a value of the objective function. Here, the optimal code may be generated by a control center or by each of the radars. However, the present disclosure is not limited thereto.

The code allocating apparatus includes the code interval adjuster 210 configured to adjust the interval during which a code is generated. The interval during which the code is generated is referred to as the code allocating interval T 306. The code allocating apparatus may control the interference signal measurer 220 to periodically measure the interference signals based on the interval during which the code is generated. Referring to FIG. 1, the interference signal measurer 220 may be connected with the code interval adjuster 210 and the interference signal sharer 230 in a same radar, and may start to measure the interference signals by receiving a control signal indicating measurement of the interference signals is to start from the code interval adjuster 210. The control signal indicating measurement of the interference signals is to start may be periodically transmitted and received during each code allocating interval T 306. The code interval adjuster 210 may perform two functions. Firstly, the code interval adjuster 210 may manage a dynamic code generating interval. Secondly, the code interval adjuster 210 may estimate an amount of time used for measuring the interference signals based on a code generating interval and transmit a management message on whether the interference signals are measured to the interference signal measurer 220. The code interval adjuster 210 may allocate a timer for the code interval adjuster 210 to estimate the amount of time used for measuring the interference signals and generate an interference signal measuring request message whenever a time out event occurs in the timer. The interference signal measurer 220 may transmit the measured mutual interference signals to the interference signal sharer 230.

The code allocating apparatus may control the radars to share the measured interference signals between the radars. The interference signal sharer 230 may perform two functions. Firstly, the interference signal sharer 230 may store a result value of the interference signal measurer 220. The result value may be stored in the memory 250. Secondly, the interference signal sharer 230 may exchange the measured interference signals with another radar. The measured interference signals may be exchanged in real time, and an exchanging method may be freely performed without limitation.

In the code allocating apparatus, the interference signal sharer 230 may store the measured interference signals and the interference signals may be exchanged between the radars. Referring to FIG. 2, the interference signal sharer 230 may be connected with the interference signal measurer 220, an interference signal sharer of another radar, and the code allocator 240. However, a connection relationship of the interference signal 230 is not limited thereto. The interference signal sharer 230 may receive output information of a matched filter from the interference signal measurer 220, and exchange interference signals measured by another radar from the interference signal sharer of another radar. The interference signal sharer 230 may transmit the interference signals (interference signals received from the interference signal measurer 220) measured by the interference signal sharer 230 and the interference signals received from another radar to the code allocator 240. As described above, to generate the optimal code, the amount of mutual interference measured by each of the radars may be collected by the control center (when the optimal code is generated by the control center) or the amount of mutual interference may be shared by an interference signal sharer of each of the radars (when the optimal code is generated by each of the radars). A communication method with respect to a radar to measure a signal and share the interference signals is not limited to a predetermined communication method.

The code allocating apparatus may include the code allocator 240 to dynamically allocate the code generated based on the interference signals to each of the radars and the code applier 260 to apply the code to each of the radars. The code allocating apparatus may further include the memory 250 to store the code set for allocating the code. In the code allocating apparatus, the code allocator 240 generates the objective function based on the interference signals in operation 105. The code allocator 240 selects an optimal code set among pre-generated code sets using the objective function in operation 106. The code allocator 240 may perform two functions. Firstly, the code allocator 240 may generate the objective function based on the interference signals received from the interference signal sharer 230. Secondly, the interference signal allocator 240 may select the optimal code set among code sets stored in the memory 250 using the generated objective function.

The code allocator 240 may be connected with the interference signal sharer 230 and the code applier 260. Although the connection relationship between configurations is illustrated in FIG. 2, the present disclosure is not limited to the connection relationship. The code allocator 240 may receive the interference signals between the radars from the interference signal sharer 230, transmit the generated objective function to the memory 250 to store the objective function in the memory 250, and receive the optimal code from the memory 250.

The code allocator 240 may generate the objective function based on the interference signals measured by each of the radars. Below Equations indicate that the objective function is changed based on the amount of mutual interference. Detailed description of Equations will be provided below, and the present disclosure is not limited to Equations.

$$E(t) = \sum_{n=1}^{N} \sum_{i=1}^{L-1} |A_n[i]|^2 + \sum_{n_1=1}^{N-1} \sum_{n_2=n_1+1}^{N} \left[ \lambda_{n_1,n_2}(t) \sum_{i=-L+1}^{L-1} |C_{n_1,n_2}[i]|^2 \right] \quad \text{[Equation 1]}$$

A first term denotes a sum of sidelobe energies among auto-correlation values of all codes, and a second term denotes an energy of mutual interference value of all codes. Based on the second term, the present disclosure may assign different weights for each mutual interference value ($\lambda_{n_1,n_2}(t)$), and set a weight based on a function that is changed as time elapses. The code may be dynamically allocated based on the mutual interference value.

A method of defining the weights of Equation 1 based on an amount of a measured mutual interference signal according to an example embodiment will be described below. In a radar system in which a frequency is shared, estimation of a weather parameter may be greatly influenced by a signal to interference ratio (SIR). Thus, the objective function generated by determining a weight based on the SIR will be explained according to this example embodiment.

$$\lambda_{n_1,n_2}(t) = f(y_{MF}^{(n_1)}(n_1), y_{MF}^{(n_1)}(n_2), y_{MF}^{(n_2)}(n_2), y_{MF}^{(n_2)}(n_1)) \quad \text{[Equation 2]}$$

In Equation 2, $y_{MF}^{(n_1)}(n_2)$ denotes a result value of a matched filter calculated in a radar n1. The matched filter may include a code allocated to a radar n2 and use a signal received from the radar n1 based on an input of the matched filter. Because codes are orthogonal, $y_{MF}^{(n_1)}(n_2)$ may be considered to be an intensity of an interference signal of the radar n2 sensed by the radar n1.

Here, a code allocated for calculating $\lambda_{n_1,n_2}(t)$ may be included in a code set obtained when a value of all weights corresponds to $T_{SIR}$ in E(t) of Equation 1. $T_{SIR}$ may be a threshold of a SIR required for satisfying requirements of a weather radar as a setting value. The threshold may be appropriately adjusted and an appropriate value may be empirically obtained through a number of experiments.

$$f(y_{MP}^{(n_1)}(n_1) \cdot y_{MP}^{(n_1)}(n_2) \cdot y_{MP}^{(n_2)}(n_2) \cdot y_{MP}^{(n_2)}(n_1)) = \quad \text{[Equation 3]}$$
$$\max\left[\frac{T_{SIR}}{y_{MP}^{(n_1)}(n_1)/y_{MP}^{(n_1)}(n_2)} \cdot \frac{T_{SIR}}{y_{MP}^{(n_2)}(n_2)/y_{MP}^{(n_2)}(n_1)}\right]$$

Because the method of generating the optimal code based on the generated objective function is well known to those skilled in the art, detailed description of the same is omitted. The memory 250 may be used to apply a code to a radar in real time. The memory 250 may be connected to the code allocator 240. That is, the objective function may be received from the code allocator 240 and the optimal code set corresponding to the objective function may be transmitted to the code allocator 240.

The code applier 260 applies the optimal code set to each of the radars in operation 107. The code applier 260 may apply the optimal code retrieved from the code allocator 240 to generate a reception signal. Observation material is shared to apply the generated code to each of the radars. In more detail, when the control center exists, the control center may directly generate a code and transmit the code to each of the radars. When the control center is absent, the code may be generated in each of the radars and each of the radars may use a corresponding allocated code and have other codes allocated to other radars as well. Here, all radars may have code sets because all the radars perform calculation based on same observation material.

A great amount of time may be required for optimizing the objective function. Although the amount of time depends on processing power of a computer used to perform calculation, optimizing could still take a number of hours. To solve such issue, the preset disclosure proposes the following method. The code allocator 240 may generate the optimal code based on each weight before the radars start operating, and store the optimal code in a memory table of each of the radars. The code allocator 240 may calculate the weights based on the measured amount of the mutual interference when the radars are operating, and search for an optimal code value corresponding to the calculated weights in the memory table. When a set of the calculated weights are not retrieved from the memory table, the code allocator 240 may select a code set corresponding to a weight of which a Euclidean distance, a second norm, and a vector value are relatively small measured by considering the calculated weight set as a vector.

Figure 4:
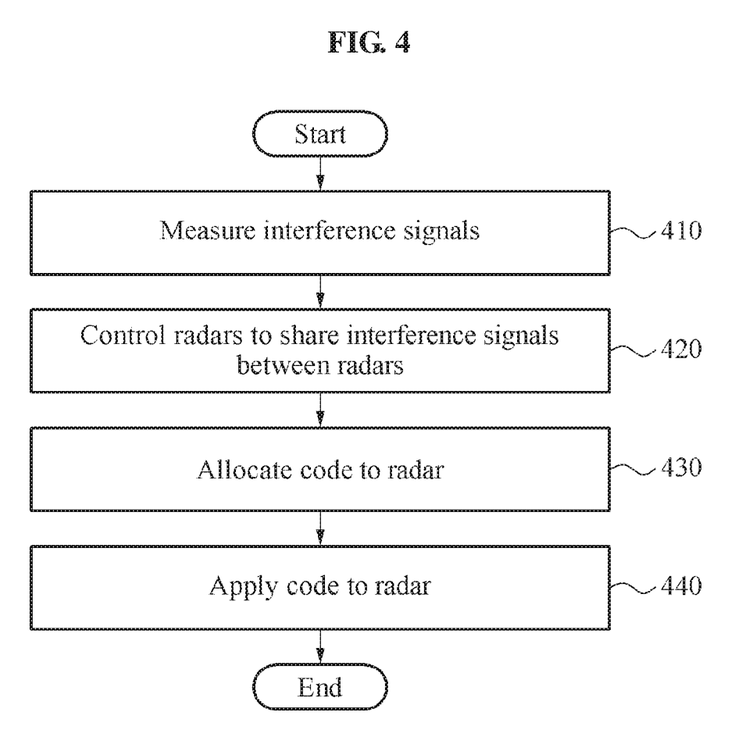
FIG. 4 is a flowchart illustrating a code allocating method according to an example embodiment.

FIG. 4 is a flowchart illustrating a code allocating method according to an example embodiment.

The code allocating method may include operation 410 in which interference signals are measured. The interference signal measurer 220 may measure the amount of mutual interference between the radars. The matched filter may include n codes previously used by the radars in the operation (corresponding to m initial pulses of the code allocating interval T 306) for measuring the interference signals, and the interference signal measurer 220 may store result values. The amount of mutual interference between the radars may be measured at an initial period of the code allocating interval T 360. In more detail, the code allocating interval T 306 may have values of N pulse repetition times (PRTs), and m initial pulses of the N PRTs may be used for measuring the amount of mutual interference. Referring to FIG. 3, five interference signals 301, 302, 303, 304, and 305 are included in the code allocating interval T 306. Here, the code allocating interval T 306 may have four PRTs. However, as described above, all interference signals in the code allocating interval T 306 may not be measured when the interference signal measurer 220 measures the interference signals during the interference measuring period 307. When the code allocating apparatus measures the interference signals during the interference measuring period 307, the code allocating apparatus may obtain the interference signals by measuring the initial two interference signals 301 and 302, and input and store the result value to the pre-obtained n matched filters 221 through 22n as illustrated in FIG. 2.

Each of the radars may use an output value of a matched filter to measure the amount of mutual interference between the radars. A code allocated to each of the radars may be orthogonal to each other (may not be perfectly orthogonal) during an interval during which the code allocating apparatus operates and thus, the output value of the matched filter including the code allocated to each of the radars may be considered to be an indication of a level of interference of another radar. For example, an output value of a matched filter including a code of the matched filter may be considered to be a signal intensity of the matched filter sensed by each of the radars. In more detail, an interference amount of a radar j sensed by a radar i(1<=i<=k) may be obtained based on an output value of a matched filter including a code allocated to the radar j using a signal received from an interference measurement phase. Similarly, the radar i may include a matched filter including a code of another radar other than the radar j, and an output value of each matched filter may be obtained.

Also, k output values obtained by each of the radars may be used for generating the objective function and generating an optimal code that minimizes a value of the objective function. Here, the optimal code may be generated by a control center or by each of the radars. However, the present disclosure is not limited thereto.

The code allocating method includes adjusting the interval during which a code is generated. The interval during which the code is generated is referred to as the code allocating interval T 306. The code allocating method may further include controlling the interference signal measurer 220 to periodically measure the interference signals based on the interval during which the code is generated. Referring to FIG. 1, the interference signal measurer 220 may be connected with the code interval adjuster 210 and the interference signal sharer 230 in a same radar, and may start to measure the interference signals by receiving a control signal indicating measurement of the interference signals is to start from the code interval adjuster 210. The control signal indicating measurement of the interference signals is to start may be periodically transmitted and received during each code allocating interval T 306. As described above, the code interval adjuster 210 may manage a dynamic code generating interval, estimate an amount of time used for measuring the interference signals based on a code generating interval, and transmit a management message on whether the interference signals are measured to the interference signal measurer 220. The code interval adjuster 210 may allocate a timer for the code interval adjuster 210 to estimate the amount of time used for measuring the interference signals and generate an interference signal measuring request message whenever a time out event occurs in the timer. The interference signal measurer 220 may transmit the measured mutual interference signals to the interference signal sharer 230.

The code allocating method may further include controlling the radars to share the measured interference signals between the radars in operation 420. The interference signal sharer 230 may perform two functions. Firstly, the interference signal sharer 230 may store a result value of the interference signal measurer 220. The result value may be stored in the memory 250. Secondly, the interference signal sharer 230 may exchange the measured interference signals with another radar. The measured interference signals may be exchanged in real time, and an exchanging method may be freely performed without limitation.

The code allocating method may further include storing the measured interference signals and exchanging the interference signals between the radars. The interference signal sharer 230 may receive output information of a matched filter from the interference signal measurer 220, and exchange interference signals measured by another radar from the interference signal sharer of another radar. The interference signal sharer 230 may transmit the interference signals (interference signals received from the interference signal measurer 220) measured by the interference signal sharer 230 and the interference signals received from another radar to the code allocator 240. As described above, to generate the optimal code, the amount of mutual interference measured by each of the radars may be collected by the control center (when the optimal code is generated by the control center) or the amount of mutual interference may be shared by an interference signal sharer of each of the radars (when the optimal code is generated by each of the radars). A communication method with respect to a radar to measure a signal and share the interference signals is not limited to a predetermined communication method.

The code allocating method may include dynamically allocating the code generated based on the interference signals to each of the radars in operation 430. The code allocating method may include applying the code to each of the radars in operation 440. The code allocating method may further include storing the code set for allocating the code in the memory 250. In the code allocating method, the code allocator 240 generates the objective function based on the interference signals, and the objective function may be generated by allocating a weight to each of the shared interference signals. The code allocating method may further include selecting an optimal code set among pre-generated code sets using the objective function. The code allocator 240 may perform two functions. Firstly, the code allocator 240 may generate the objective function based on the interference signals received from the interference signal sharer 230. Secondly, the interference signal allocator 240 may select the optimal code set among code sets stored in the memory 250 using the generated objective function. The code allocator 240 may receive the interference signals between the radars from the interference signal sharer 230, transmit the generated objective function to the memory 250 to store the objective function in the memory 250, and receive the optimal code from the memory 250.

The code allocator 240 may generate the objective function based on the interference signals measured by each of the radars.

The code allocating method may further include applying, by the code applier 260, the optimal code set to each of the radars. The code applier 260 may apply the optimal code retrieved from the code allocator 240 to generate a reception signal. Research material is shared to apply the generated code to each of the radars. In more detail, when the control center exists, the control center may directly generate a code and transmit the code to each of the radars. When the control center is absent, the code may be generated in each of the radars and each of the radars may use a corresponding allocated code and have other codes allocated to other radars as well. Here, all radars may have code sets because all the radars perform calculation based on same observation material.

A great amount of time may be required for optimizing the objective function. Although the amount of time depends on processing power of a computer used to perform calculation, optimizing could still take a number of hours. To solve such issue, the preset disclosure proposes the following method. The code allocator 240 may generate the optimal code based on each weight before the radars starts operating, and store the optimal code in a memory table of each of the radars. The code allocator 240 may calculate the weights based on the measured amount of the mutual interference when the radars are operating, and search for an optimal code value corresponding to the calculated weights in the memory table. When a set of the calculated weights are not retrieved from the memory table, the code allocator 240 may select a code set corresponding to a weight of which a Euclidean distance, a second norm, and a vector value are relatively small measured by considering the calculated weight set as a vector.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A code allocating apparatus comprising:
   an interference signal measurer configured to measure interference signals;
   an interference signal sharer configured to control radars to share the measured interference signals between the radars;
   a code allocator configured to dynamically allocate a code generated based on the measured interference signals to each of the radars; and
   a code applier configured to apply the code to each of the radars.

2. The apparatus of claim 1, further comprising: a memory configured to store a code set for allocating the code.

3. The apparatus of claim 1, wherein the interference signal sharer is configured to store the measured interference signals and allow the interference signals to be exchanged between the radars.

4. The apparatus of claim 1, wherein the code allocator is configured to generate an objective function based on the interference signals, and the objective function is generated by allocating a weight to each of the shared interference signals.

5. The apparatus of claim 4, wherein the code allocator is configured to select an optimal code set among pre-generated code sets using the objective function.

6. The apparatus of claim 5, wherein the code allocator is configured to apply the optimal code set to each of the radars.

7. The apparatus of claim 1, further comprising: a code interval adjuster configured to adjust an interval during which the code is generated, and control the interference signal measurer to measure the interference signals based on the interval during which the code is generated.

8. A code allocating method comprising:
   measuring interference signals;
   controlling radars to share the measured interference signals between the radars;
   dynamically allocating a code generated based on the interference signals to each of the radars; and
   applying the code to each of the radars.

9. The method of claim 8, further comprising: storing a code set for allocating the code in a memory.

10. The method of claim 8, further comprising: storing the measured interference signals and exchanging the interference signals between the radars by an interference signal sharer.

11. The method of claim 8, further comprising:
    generating an objective function based on the measured signals,
    wherein the objective function is generated by allocating a weight to each of the shared interference signals.

12. The method of claim 11, further comprising: selecting an optimal code set among pre-generated code sets using the objective function.

13. The method of claim 12, further comprising: applying the optimal code set to each of the radars.

14. The method of claim 8, further comprising:
    adjusting an interval during which the code is generated; and
    controlling an interference signal measurer to measure the interference signals based on the interval during which the code is generated.

* * * * *